US007672448B2

(12) United States Patent
Schley-May et al.

(10) Patent No.: US 7,672,448 B2
(45) Date of Patent: *Mar. 2, 2010

(54) NETWORK INTERFACE DEVICE WITH A REMOTE POWER SOURCE

(75) Inventors: James T. Schley-May, Nevada City, CA (US); Brian Hinman, Los Gatos, CA (US); Andrew Norell, Grass Valley, CA (US); Paul Trethewey, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/475,572

(22) Filed: Jun. 22, 2006

(65) Prior Publication Data

US 2006/0291493 A1 Dec. 28, 2006

Related U.S. Application Data

(60) Provisional application No. 60/694,114, filed on Jun. 23, 2005.

(51) Int. Cl.
*H04M 1/00* (2006.01)
*H04M 9/00* (2006.01)

(52) U.S. Cl. ..................................... 379/413
(58) Field of Classification Search .................. 379/413
See application file for complete search history.

(56) References Cited

U.S. PATENT DOCUMENTS

| 4,121,054 | A | 10/1978 | Popkin |
| 4,157,567 | A | 6/1979 | Scholz |
| 4,763,104 | A * | 8/1988 | Inoue et al. ............ 340/310.11 |
| 6,262,905 | B1 * | 7/2001 | Zhang et al. ................. 363/127 |
| 6,449,348 | B1 | 9/2002 | Lamb et al. |
| 6,665,404 | B2 | 12/2003 | Cohen |
| 6,975,723 | B2 | 12/2005 | Scott et al. |
| 7,149,903 | B1 | 12/2006 | Chan et al. |
| 7,305,006 | B1 | 12/2007 | Bella |
| 2002/0003873 | A1 * | 1/2002 | Rabenko et al. ............. 379/413 |
| 2002/0073434 | A1 * | 6/2002 | Pience ........................ 725/119 |
| 2002/0090962 | A1 | 7/2002 | Struhsaker et al. |
| 2002/0122496 | A1 | 9/2002 | Klein-Reesink |
| 2002/0136394 | A1 | 9/2002 | Snow et al. |
| 2003/0068033 | A1 * | 4/2003 | Kiko ........................... 379/413 |
| 2003/0215020 | A1 | 11/2003 | Dong et al. |
| 2005/0180561 | A1 | 8/2005 | Hazani et al. |
| 2006/0092671 | A1 | 5/2006 | Yamashita |
| 2006/0203981 | A1 * | 9/2006 | Binder ..................... 379/90.01 |
| 2006/0215771 | A1 | 9/2006 | Scott et al. |
| 2007/0085631 | A1 | 4/2007 | Larson et al. |
| 2007/0242757 | A1 * | 10/2007 | Schley-May et al. ......... 375/257 |
| 2007/0263852 | A1 * | 11/2007 | Schley-May et al. ......... 379/413 |

OTHER PUBLICATIONS

PCT International Search Report, PCT/US06/24817 filed Jun. 23, 2006, mailed Dec. 13, 2007.
PCT Written Opinion of the International Searching Authority, PCT/US06/24817 filed Jun. 23, 2006, mailed Dec. 13, 2007.

* cited by examiner

*Primary Examiner*—Alexander Jamal
(74) *Attorney, Agent, or Firm*—Blakely, Sokoloff, Taylor & Zafman LLP

(57) ABSTRACT

Various methods, apparatuses, and systems in which a residential gateway is located at the network interface device and is powered with a remote power source inside the residence. In another embodiment, bi-directional data communication between the residential gateway and the remote power source is also enabled.

18 Claims, 9 Drawing Sheets

US 7,672,448 B2

NETWORK INTERFACE DEVICE WITH A REMOTE POWER SOURCE

RELATED APPLICATIONS

This application claims the benefit of U.S. provisional application No. 60/694,114, filed on Jun. 23, 2005.

TECHNICAL FIELD OF THE INVENTION

Embodiments of the invention generally relate to telecommunication systems used to provide broadband access. More particularly, an aspect of an embodiment of the invention relates to providing power to network interface devices.

BACKGROUND

Typically, telecommunication systems used to provide broadband access to residential customers contain a residential gateway which consists of an xDSL (any type of digital subscriber line) modem or xPON (any type of passive optical network) interface combined with various local area networking (LAN) technologies to enable sharing the broadband access with other computers or devices within the residence. 802.11 wireless and home phone line networking (HPNA) are examples of LAN technologies. In addition, some telecommunication systems may provide a voice-over-internet-protocol (VOIP) feature to allow telephone calls via the broadband link. Some systems may, in addition to broadband access sharing, need to distribute broadband media content such as video streams into various locations within the residence.

Typically the residential gateway is located inside the house. However, it is desirable to locate the residential gateway at the Network Interface Device (NID) outside the house. A NID is the point of demarcation between the Unbundled Network Element (UNE) loop and the end user's inside wire. Reasons for desirability of locating the residential gateway at the NID include the ability to provide simplified installation wiring and to eliminate the need to have the user home when the bulk of installation occurs. Further, as fiber to the neighborhood rolls out, integration will be easier if the active electronics are already present at the NID. Also, installation practices can be merged between xPON and xDSL systems such that the primary network termination is the only difference.

However, a significant problem in trying to locate the residential gateway at the NID is the problem of providing power. There is often no source of Alternating Current (AC) mains power accessible at the NID location. Consequently, powering from inside the house is the only viable option. The use of existing phone wiring would be the most desirable way, since the cost of installing new wiring is prohibitive. However, the existing phone wire must be reserved for voice band telephony including its requisite Direct Current (DC) signaling. This constraint appears to preclude its use for supplying power to the NID.

It is thus desirable to use existing phone wiring to power the residential gateway.

SUMMARY

Various methods, apparatuses, and systems in which a residential gateway is located at the network interface device and is powered with a remote power source inside the residence using a phone line are described. In another embodiment, bi-directional data communication between the residential gateway and the remote power source is enabled.

The present invention is described in conjunction with systems, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DISCUSSION

In the following description, numerous specific details are set forth, such as examples of specific signals, named components, connections, number of windings in a transformer, example voltages, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. The specific details set forth are merely exemplary. The specific details may be varied from and still be contemplated to be within the spirit and scope of the present invention. The term coupled is defined as meaning connected either directly to the component or indirectly to the component through another component.

Figure 1:
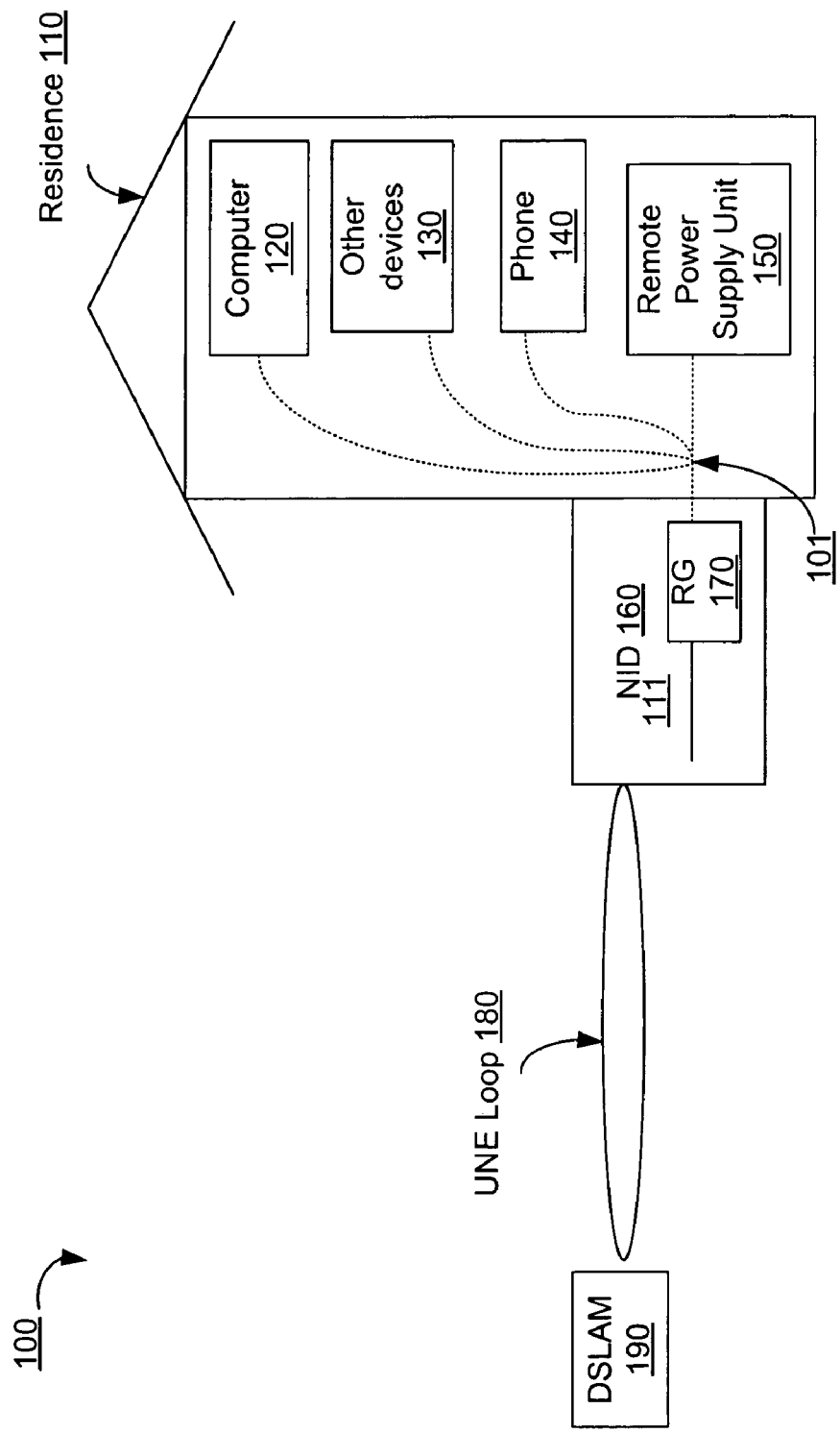
FIG. 1 illustrates a schematic diagram of an environment in which a NID located residential gateway may be powered.

In certain embodiments of the invention, as illustrated in FIG. 1, power is provided to the residential gateway 170 located at the NID 160 via the existing phone line 101 by a remote Power Supply Unit (PSU) 150 located inside the residence 110. The NID 160 is the point of demarcation between the UNE loop 108 and the end user's inside wire 101. Thus, a single existing phone line 101 is used to supply demands of the residential gateway located at the NID. This is accomplished, in part, by placing active electronics in the NID 160, and by having the internal power supply feeding the single phone line 101.

As shown in FIG. 1, one or more telephones 140 may couple to line 101. Other POTS devices 130, such as fax machines, answering machines, and analog modems, may also couple to line 101. A computer 120 may also couple to line 101. Optional HPNA devices may also couple to line 101, such as via a filter (not shown). A HPNA device may be connected to a media device, such as a set-top box.

Figure 2:
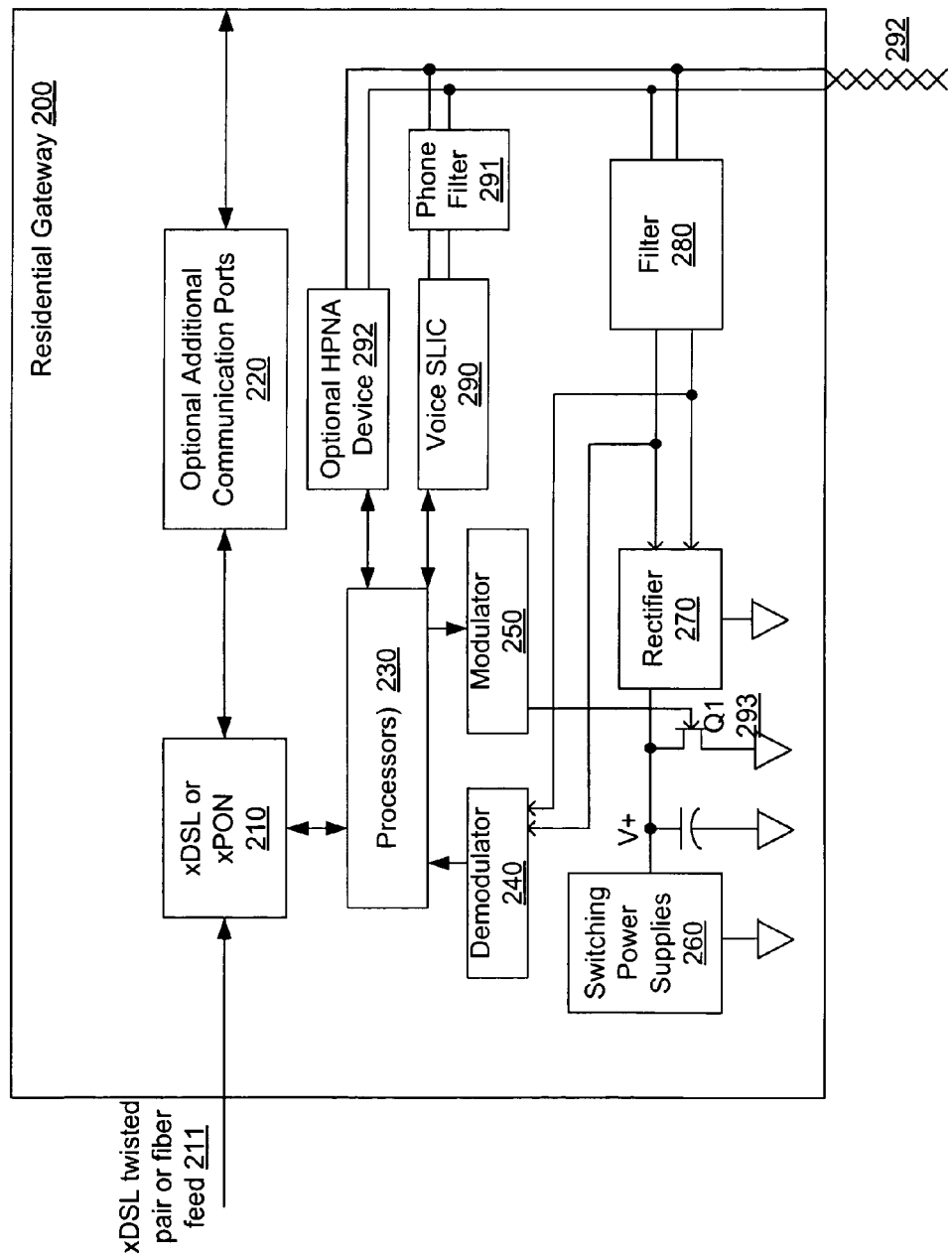
FIG. 2 illustrates a schematic diagram of an embodiment of a NID located residential gateway powered by a remote power source.
Figure 3:
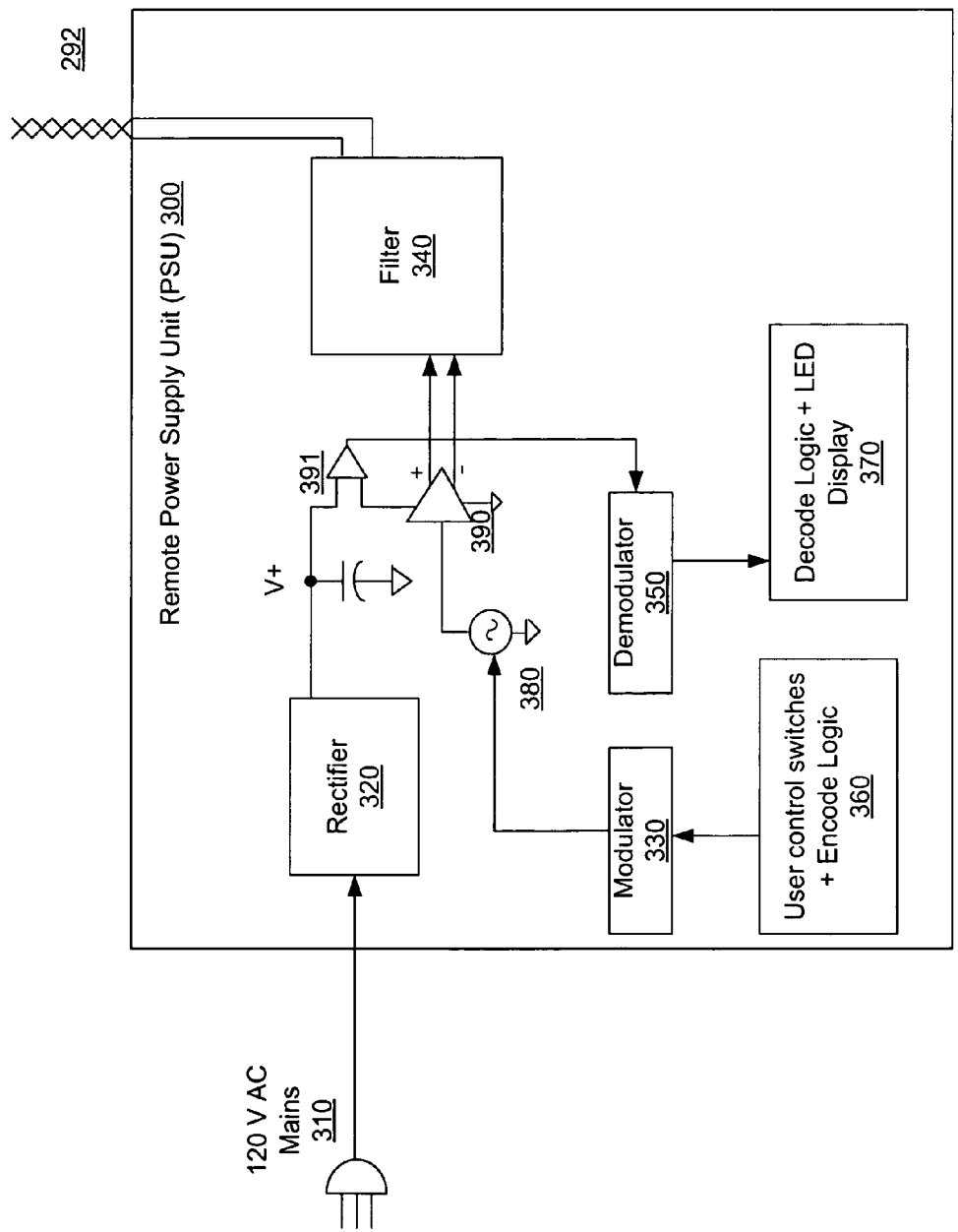
FIG. 3 illustrates a schematic diagram of an embodiment of a remote power source.

FIGS. 2 and 3 illustrate an embodiment of a residential gateway 200 and a remote power supply unit (PSU) 300. The residential gateway 200 provides the termination point 210 for a feed line 211, which may be xDSL feed line or fiber feed line if xPON. In addition to broadband media content, the residential gateway 200 provides the IP connection necessary for Voice Over IP (VOIP). Voice data is encoded and decoded by processor 230 and sent through a subscriber line interface circuit (SLIC) 290. The SLIC 290 provides the central office functionality to any phones connected to the phone line 292. The SLIC 290 has a phone filter 291 in front of it to provide impedance isolation and filtering from phone line 292. According to one embodiment, the phone filter 291 is a multi-order bidirectional low pass filter that has a notch at a selected frequency for added attenuation.

The residential gateway 200 may optionally have other communication ports 220 on it, such as coaxial cable or a wireless port. The residential gateway 200 may optionally support HPNA networking to enable media content delivery to HPNA devices 292 such as set top boxes within the residence.

Referring to FIG. 3, in one embodiment, the remote PSU 300 plugs into 120 Volts (V) AC mains 310 and generates a power signal at a particular frequency which is injected onto the phone line 292. In one embodiment, the frequency selected is 25 kilo-hertz (KHz). At 25 KHz, the power signal does not interfere with voice service, since this is far above the voice band and inaudible. It is to be appreciated that other frequencies would also work. In one embodiment, the power signal is injected onto the line 292 via a series resonant LC filter 340 having a sharp quality factor (Q). The LC filter 340 is sized such that the impedance and losses of the LC filter 340 is minimized at 25 KHz but high at frequencies above and below it. The LC filter 340 effectively isolates the 25 KHz from voice band which is DC-4 KHz and from HPNA band which is 4 mega-hertz (MHz) and higher. In one embodiment, as discussed below, the LC filter 340 also isolates from 306 KHz if used.

The 25 KHz power signal can be as high 30 Volts Root Mean Square (Vrms) and still meet the National Electric Code's requirements for class 2 power. The voltage should be kept as high as possible to minimize the power loss through the phone line 292 to the residential gateway 200. Generation of the 25 KHz power signal may be accomplished by using an oscillator 380 connected to a power amplifier 390. In one embodiment, the power amplifier 390 is a class D amplifier. It is to be appreciated, that the power amplifier 390 could also be linear. The power supply for the power amplifier 390 is made from rectified (using rectifier 320) and filtered line voltage (using filter 391) that may be transformer isolated. The transformer is not shown in FIG. 3.

Referring again to FIG. 2, in the residential gateway 200, the 25 KHz signal is extracted from a series resonant hi-Q LC filter 280. The signal is rectified using rectifier 270. In one embodiment, rectifier 270 is implemented using diodes. In another embodiment, rectifier 270 is implemented using transistors in a synchronous rectifier configuration. The filtered signal V+ is then used to feed the multitude of switching power supply regulator circuits 260 in the residential gateway 200.

Telephones that share the line 292 are impedance isolated from the 25 KHz power so as not to be adversely affected and also so as to not load the power signal. In one embodiment, this may be accomplished by having phone filters between each telephone and the line. The phone filters may be multi-order bidirectional low pass filters that have a notch at 25 KHz for added attenuation.

According to one embodiment of the present invention, bi-directional data communication occurs between the residential gateway 200 and the PSU 300. One reason is that since the residential gateway 200 is NID 160 mounted, status lights will not be accessible to the user unless they are located in the PSU 300. In the other direction, it may be necessary for the user to issue a reset or other diagnostic command to the residential gateway 200 via switches located in the PSU 300.

According to certain embodiments of the present invention, upstream communication from the PSU 300 to the residential gateway 200 is enabled by modulating the 25 KHz power signal using modulator 330 with encoded data. Accordingly, the current draw of the residential gateway 200 can be modulated by modulating the switchers' feedback control pin(s) 260 with some low frequency data in the hundreds of hertz. FM modulation is used in one embodiment but other types of modulation (e.g., amplitude modulation (AM), phase modulation (PM), phase shift keying (PSK)) could also be used. The control signal can be encoded from upstream data derived from the user switches 360. In the residential gateway 200, the 25 KHz signal can be monitored for frequency (or phase in the case of PM or magnitude in the case of AM) and demodulated using demodulator 240 to retrieve the data.

In the downstream direction, the concept of load modulation is employed. Q1 293 represents a shunt load that is in parallel with the main load switching regulators 260. Q1 293 is biased to a small percentage of the total load, and then modulated about that center point by an amplitude modulator 250, causing the 25 KHz current consumption to modulate. At the PSU 300, current consumption is monitored using current sensor 391 to provide a signal that can be demodulated by demodulator 350. After demodulation it is decoded using decode logic 370 to drive status light emitting diodes (LEDs). In one embodiment, the signal is decoded with an error check to prevent a PSU interruption from causing a false reset.

Status LEDs are an example of indicators that may be implemented on the PSU 300 to reflect the state of the residential gateway 200, PSU 300, or both. The PSU 300 may also have indicator lights that reflect state as relayed by the residential gateway 200. Other indicators may also be used. In one embodiment, LEDs may be refreshed at a rate of 2 Hz.

In both directions, the modulation and demodulation functions can be implemented with low cost frequency shift key (FSK) modem chips, dual-tone-multi-frequency (DTMF, also known as touch-tone) encoder/decoders, or other circuits. In one embodiment, the PSU 300 may have a reset button that can be used to reset the NID 160 remotely. In one embodiment, a separate small micro-chip in the NID 160 reads communications between the residential gateway 200 and the PSU 300 to make it autonomous from a NID processor.

In one embodiment, the issue of component tolerances for the inductors and capacitors that make up the 25 KHz series resonant filters is also solved. In practice, 5% tolerances are the tightest available at a reasonable cost. Because of the tolerances, the series resonant point of the filter 340 may not be precisely aligned to the oscillator 380 which is nominally 25 KHz. In addition, it is difficult to make the oscillator oscillate precisely at 25 KHz. Furthermore, the affects of temperature and aging may further compound the problem of getting the oscillator 380 and filter 340 to precisely match. If the oscillator 380 is not exactly centered at the series resonant frequency of the filter 340, there may be a huge drop in the efficiency of power delivery to the residential gateway 200.

Figure 4:
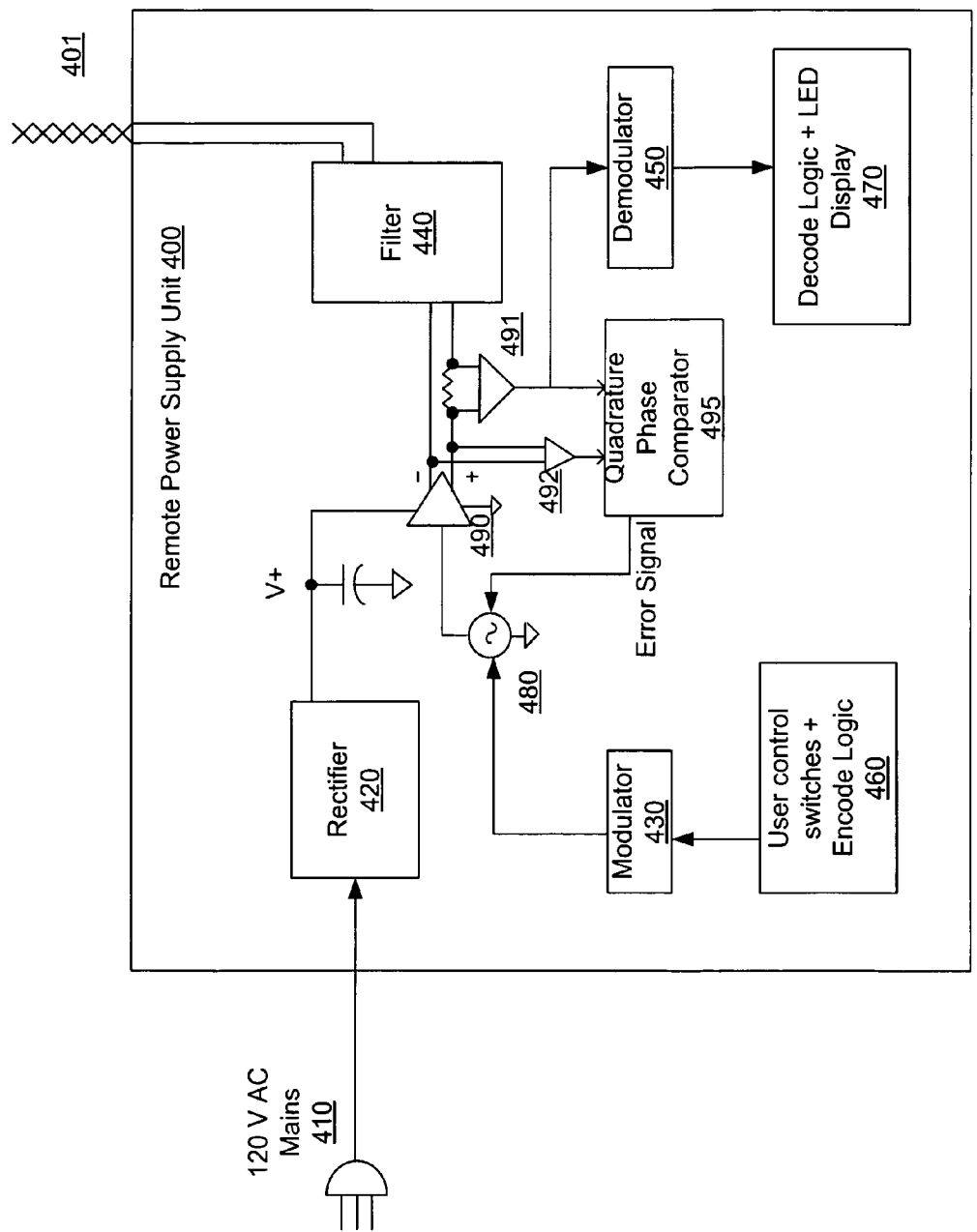
FIG. 4 illustrates a schematic diagram of an embodiment of a remote power source.

In one embodiment of the present invention, as shown in FIG. 4, the series resonant point of the actual filter components is sensed and used to force the oscillator frequency to match it. The output current and voltage of the 25 KHz power amplifier 490 are independently sensed using current sensor 491 and voltage sensor 492 respectively. Current sensor 491 may be a resistor. These signals are then compared to each other with a quadrature phase comparator circuit 495. This comparator circuit 495 generates an error voltage if the current and voltage signals are not in exact phase alignment. If voltage leads current, the error signal is of one polarity with magnitude proportional to the difference in phase. If current leads voltage, the error signal has the opposite polarity. The error signal is then filtered and applied to the voltage controlled 25 KHz oscillator 480 to alter its frequency slightly. Once the frequency changes, the phase will change as well. This forms a feedback loop which forces the frequency to be such that the error signal is minimized. In this condition, the current and voltage are in phase. In a series resonant circuit, that point corresponds to the exact series resonant point. If the series resonant point drifts due to temperature or aging, the control loop will track and keep the oscillator locked to the center. Even though there is a separate filter 440 in the PSU 400 and filter 580 in the residential gateway 500, both filters are in series and therefore combine to form one effective filter with just one series resonant point. Thus, a circuit that compensates for component tolerance issues that impact power efficiency is disclosed.

Figure 5:
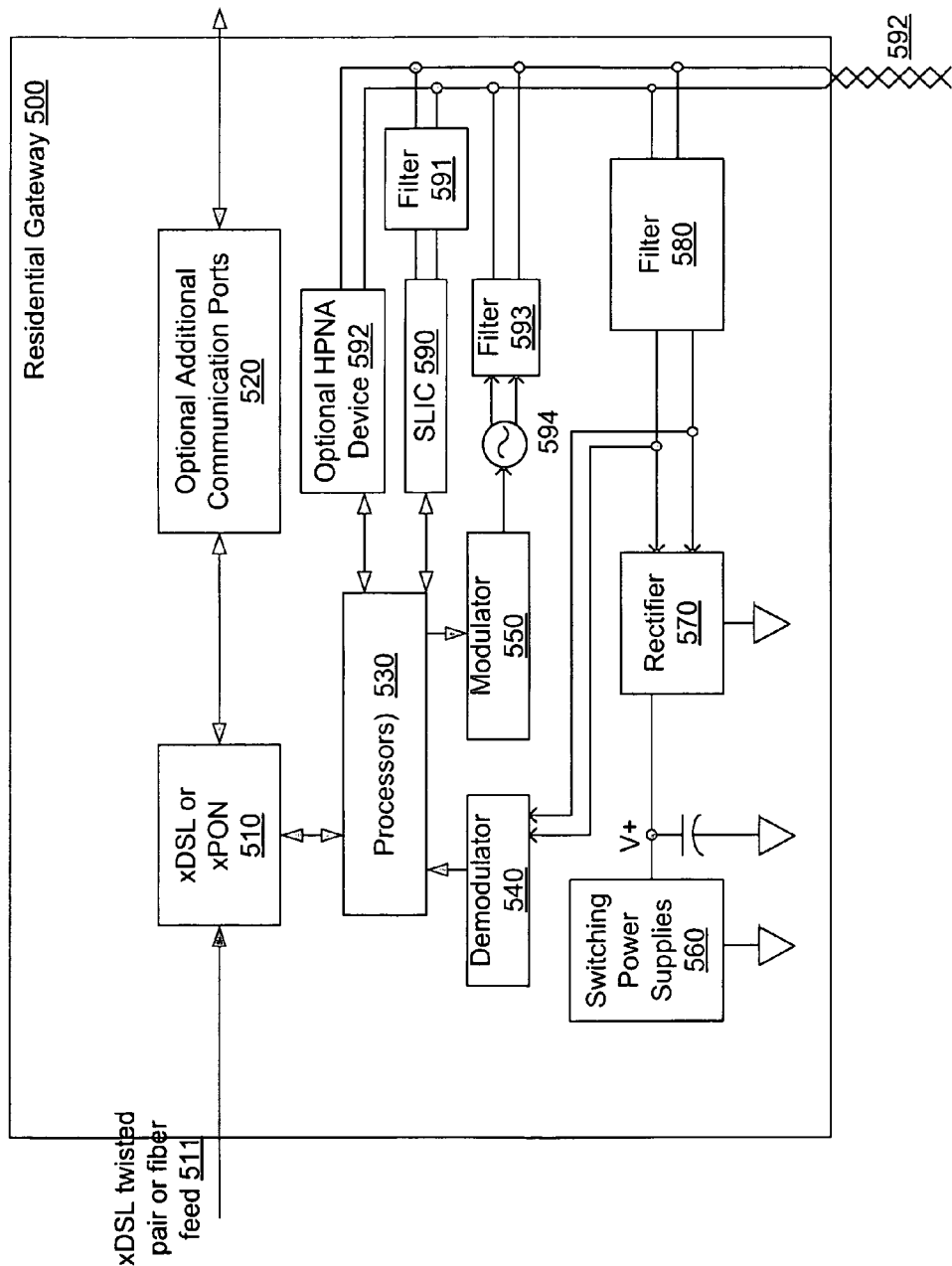
FIG. 5 illustrates a schematic diagram of an embodiment of a NID located residential gateway powered by a remote power source.
Figure 6:
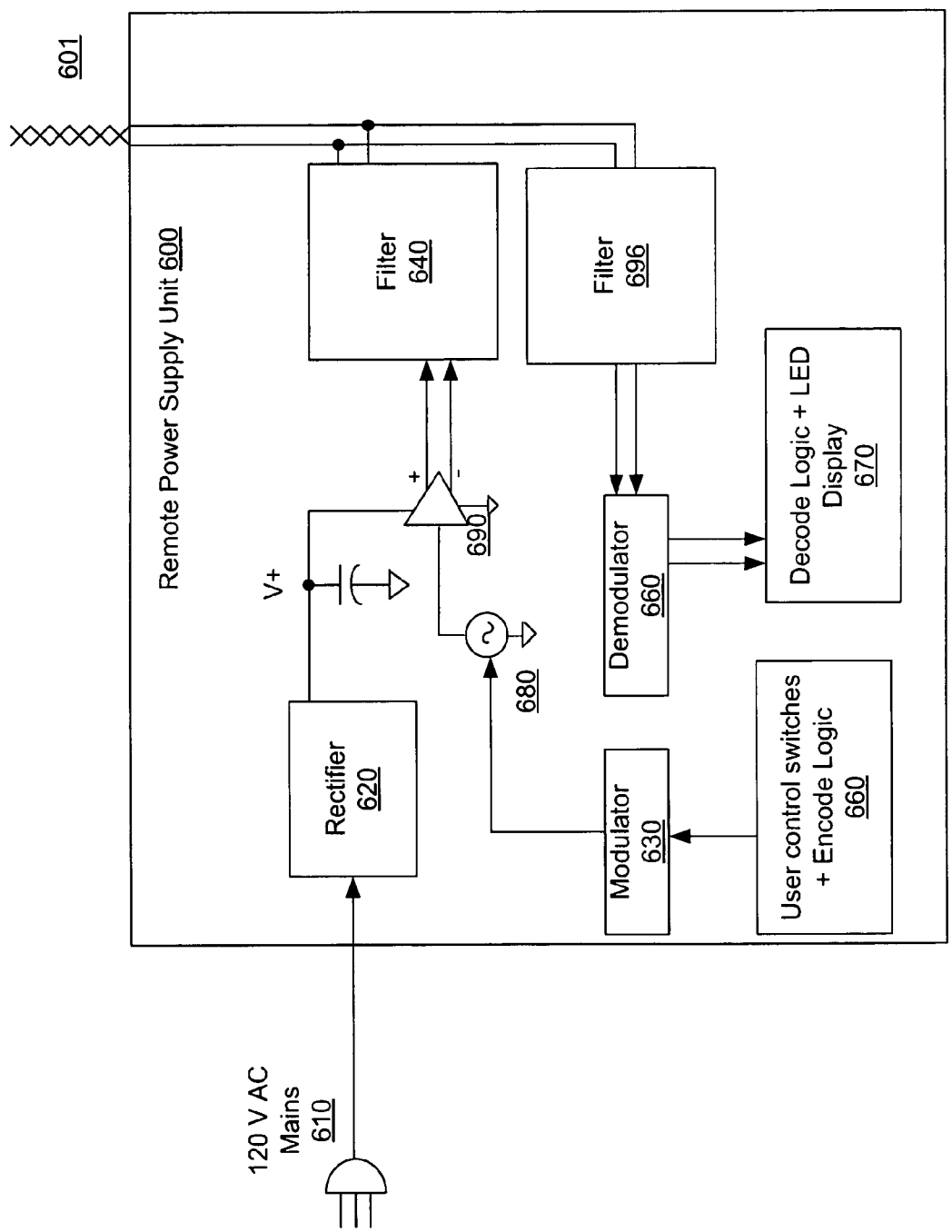
FIG. 6 illustrates a schematic diagram of an embodiment of a remote power source.

FIGS. 5 and 6 show another embodiment of a residential gateway 500 and PSU 600 in accordance with the present invention. Instead of load modulation in the downstream direction, a separate frequency band is used to communicate with the PSU 600. In one embodiment, communication with the PSU is conducted at 306 KHz, a frequency that is approximately the geometric mean between 25 KHz and 4 MHz, and is inharmonically related to either frequency. Of course, other frequencies may be used. The 306 KHz signal may be generated by a Voltage Controlled Crystal Oscillators (VCXO) 594 modulated by encoded downstream data with any convenient modulation method. The generated signal injected onto the phone line 592 by a series resonant hi-Q LC filter 593. This filter 593 also provides impedance isolation and attenuation to the other frequency bands in use. In the PSU 600, the 306 KHz signal is extracted via a similar hi-Q LC filter 696 and then demodulated using demodulator 660.

Figure 7:
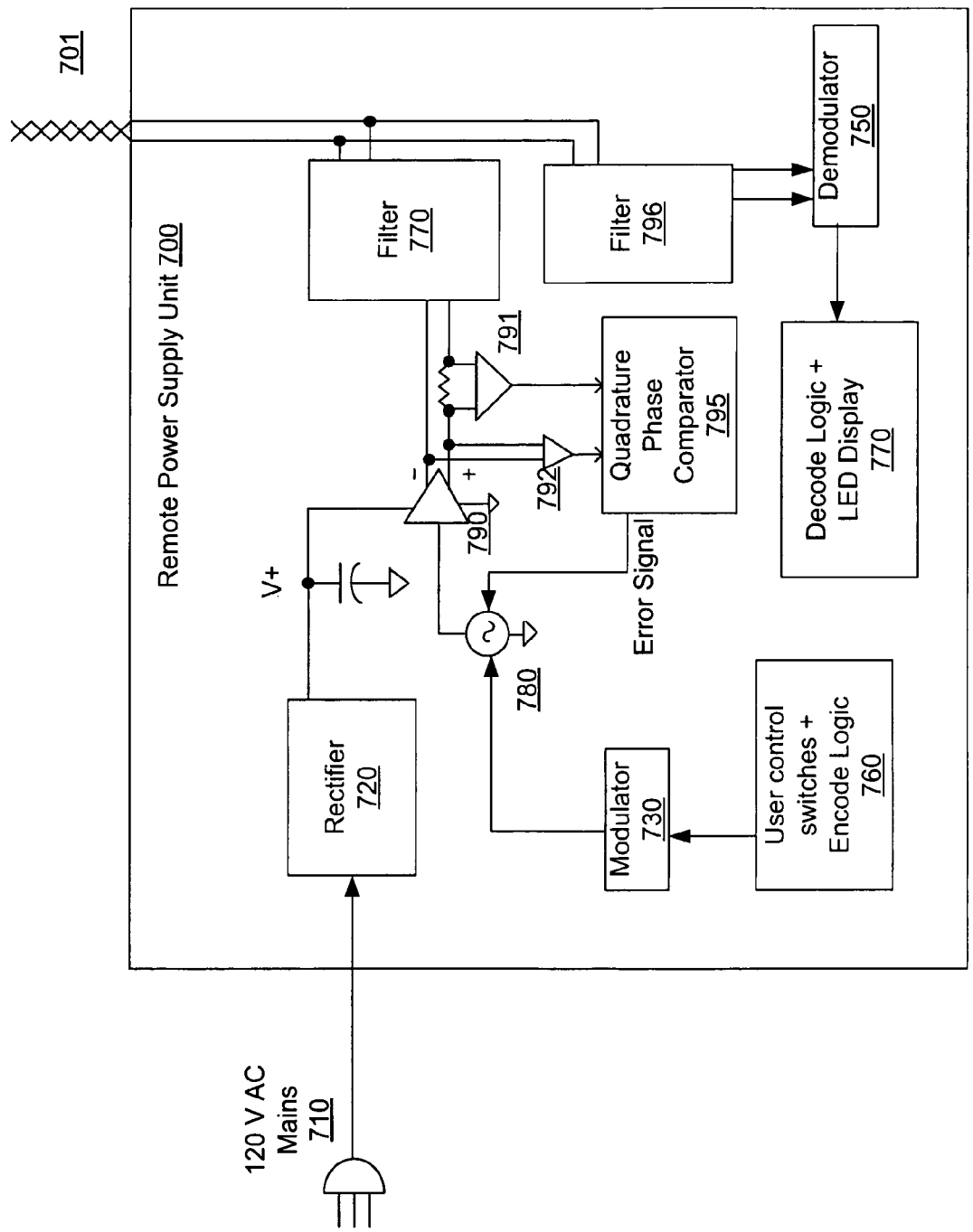
FIG. 7 illustrates a schematic diagram of an embodiment of a remote power source.

FIG. 7 shows another embodiment of a PSU 700 according to an embodiment of the present invention. The PSU 700 is similar to PSU 400 shown in FIG. 4, except that PSU 700 includes a second filter 796 to extract a 306 KHz signal from a residential gateway.

Figure 8:
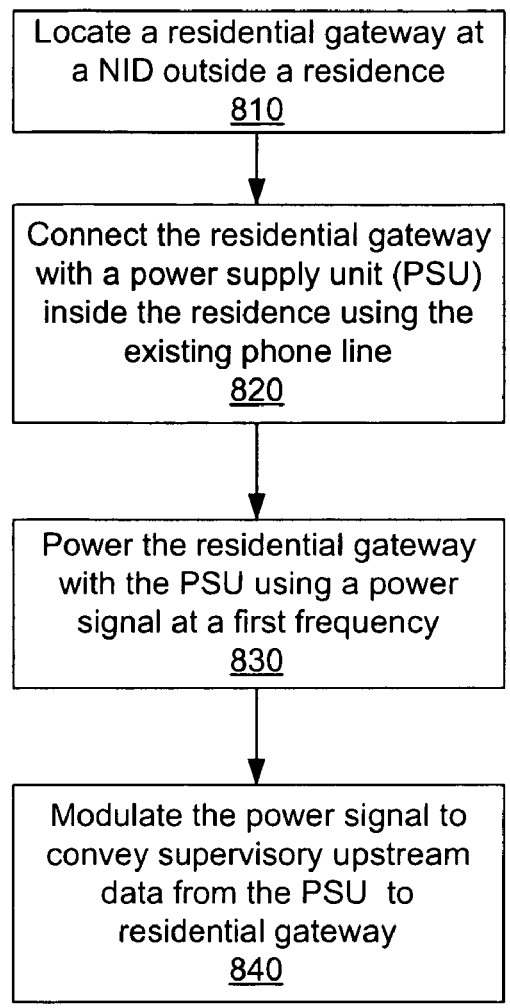
FIG. 8 illustrates a flowchart of an embodiment of a method of providing power to a NID located residential gateway.

FIG. 8 illustrates a method of providing power to a NID-located residential gateway according to an embodiment of the present invention. At block 810, a residential gateway is located at a NID located outside a residence. At block 820, the residential gateway is connected to a PSU located inside the residence using an existing phone line. At block 830, the residential gateway is powered by the PSU using a power signal at a first frequency. At block 840, the power signal is modulated to convey supervisory upstream data from the PSU to the residential gateway.

Figure 9:
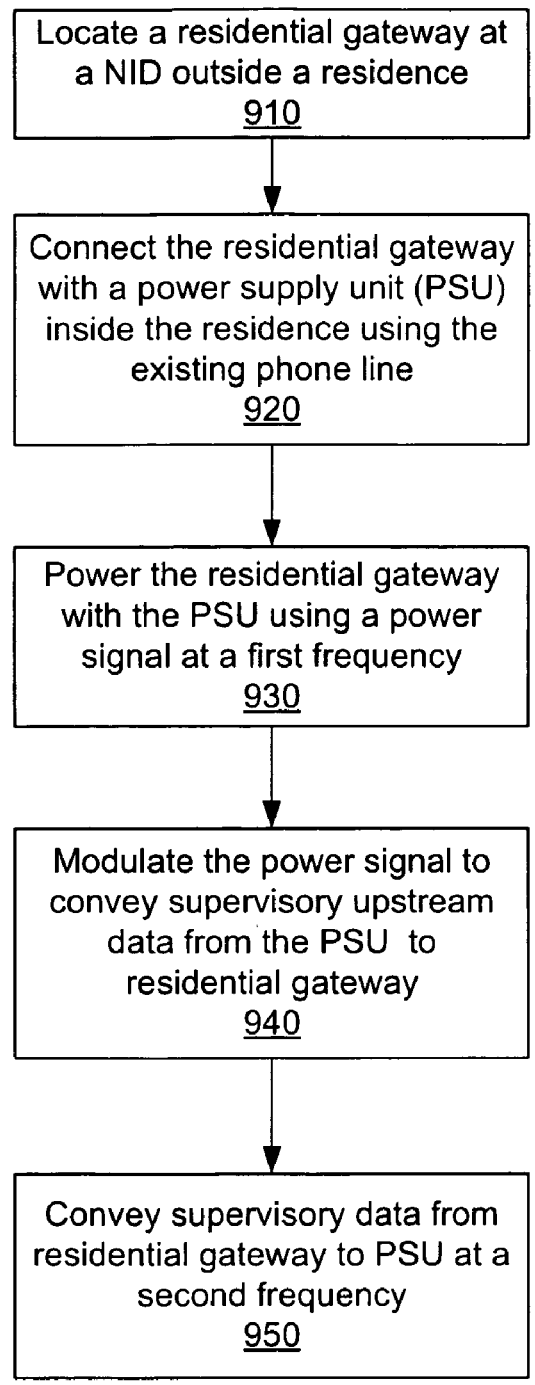
FIG. 9 illustrates a flowchart of an embodiment of a method of providing power to a NID located residential gateway.

FIG. 9 illustrates a method of providing power to a NID-located residential gateway according to an embodiment of the present invention. At block 910, a residential gateway is located at a NID located outside a residence. At block 920, the residential gateway is connected to a PSU located inside the residence using an existing phone line. At block 930, the residential gateway is powered by the PSU using a power signal at a first frequency. At block 940, the power signal is modulated to convey supervisory upstream data from the PSU to the residential gateway. At block 950, supervisory data is conveyed from residential gateway to PSU at a second frequency.

Thus, according to embodiments of the present invention, systems and method for supplying power to a NID-located residential gateway are described. The systems and methods enable the following to coexist on the same twisted pair phone line: voice band signaling and audio from SLIC to telephones, 25 KHz power, modulation of the power signal to convey supervisory upstream data from PSU to residential gateway, 306 KHz downstream channel to convey supervisory data from residential gateway, and HPNA. The configurations described herein solve several key deployment problems and enable a practical distribution system for broadband media content and voice services.

The invention is to be understood as not limited by the specific embodiments described herein, but only by scope of the appended claims.

What is claimed is:

1. An apparatus comprising:
a remote power supply unit located inside a residence, the remote power supply unit comprising:
an oscillator;
a power amplifier coupled to the oscillator; and
a first series resonant circuit coupled to the power amplifier; and
a residential gateway located at a network interface device, wherein the network interface device is located outside the residence, the residential gateway comprising:
a second series resonant circuit; and
a rectifying circuit coupled to second series resonant circuit,
wherein the residential gateway receives a power signal from the remote power supply unit over a phone line coupled between the first and second series resonant circuits to provide the power signal to the residential gateway.

2. The apparatus of claim 1, wherein the power supply unit generates the power signal at a first frequency to be injected into the phone line.

3. The apparatus of claim 2, wherein the first frequency is 25 KHz.

4. The apparatus of claim 1, further comprising a communication module configured to perform bi-directional data communication between the residential gateway and the remote power supply unit.

5. The apparatus of claim 4, further comprising a modulator to modulate the power signal at the remote power supply unit with encoded data to convey data from the remote power supply unit to the residential gateway.

6. The apparatus of claim 5, further comprising a demodulator to demodulate the encoded power signal at the residential gateway to convey data to the remote power supply unit.

7. The apparatus of claim 6, wherein the communication module conveys data to the power supply unit at a second frequency.

8. The apparatus of claim 7, wherein the residential gateway conveys data to the power supply unit at a frequency of 306 KHz.

9. The apparatus of claim 6, wherein the communication module comprises status light emitting diodes (LEDs) on the power supply unit to reflect at least one of a state of the residential gateway and the power supply unit.

10. A method comprising:
   generating a power signal by an oscillator in a remote power supply unit located inside a residence;
   amplifying the power signal by an amplifier;
   filtering the amplified power signal by a first series resonant circuit;
   supplying the power signal to a residential gateway located outside the residence using a phone line coupled to the first series resonant circuit;
   filtering the power signal by a second series resonant circuit in the residential gateway; and
   rectifying the power signal by a rectifier.

11. The method of claim 10, further comprising:
   supplying power to the residential gateway using a power signal at a first frequency.

12. The method of claim 11, wherein the first frequency is 25 KHz.

13. The method of claim 10, further comprising extracting the power signal at the residential gateway from the phone line.

14. The method of claim 10, further comprising enabling bi-directional data communication between the residential gateway and the remote power supply unit.

15. The method of claim 14, further comprising frequency modulating the power signal at the remote power supply unit with encoded data to convey data from the remote power supply unit to the residential gateway.

16. The method of claim 15, further comprising demodulating the power signal at the residential gateway to convey data to the remote power supply unit.

17. The method of claim 16, wherein the residential gateway conveys data to the remote power supply unit at a second frequency.

18. The method of claim 17, wherein the second frequency is 306 KHz.

* * * * *